United States Patent [19]

Oestreich

[11] Patent Number: 4,576,871
[45] Date of Patent: Mar. 18, 1986

[54] HEAT-RECOVERABLE ARTICLE

[75] Inventor: Ulrich Oestreich, Munich, Fed. Rep. of Germany

[73] Assignee: Siemens Aktiengesellschaft, Berlin & Munich, Fed. Rep. of Germany

[21] Appl. No.: 574,605

[22] Filed: Jan. 27, 1984

[30] Foreign Application Priority Data

Mar. 3, 1983 [DE] Fed. Rep. of Germany ....... 3307567

[51] Int. Cl.⁴ ............................................ B32B 27/32
[52] U.S. Cl. ...................................... 428/521; 428/36; 428/517; 174/DIG. 8
[58] Field of Search .................. 428/35, 36, 516, 517, 428/424.2, 424.4, 521; 174/DIG. 8

[56] References Cited

U.S. PATENT DOCUMENTS

| | | | |
|---|---|---|---|
| 4,035,534 | 7/1977 | Nyberg | 428/36 |
| 4,323,607 | 4/1982 | Nishimura et al. | 174/DIG. 8 |
| 4,390,587 | 6/1983 | Yoshimura et al. | 428/520 |
| 4,465,717 | 8/1984 | Crofts et al. | 174/DIG. 8 |
| 4,467,002 | 8/1984 | Crofts | 174/DIG. 8 |
| 4,472,468 | 9/1984 | Tailor | 174/DIG. 8 |

Primary Examiner—Edith Buffalow
Attorney, Agent, or Firm—Hill, Van Santen, Steadman & Simpson

[57] ABSTRACT

A heat-recoverable article which includes an outer layer of an opaque, dimensionally stable, thermoplastically deformable material and an inner layer of a cross-linked heat-recoverable (heat-shrinkable) material having a characteristic recovery shrinkage temperature. The outer layer has the property of becoming transparent at a decrystallization temperature which is at least as high as the shrinkage temperature, and preferably a few degrees higher, whereby the condition of the inner layer becomes visible through the outer layer when the article is heated to the decrystallization temperature.

9 Claims, 2 Drawing Figures

HEAT-RECOVERABLE ARTICLE

BACKGROUND OF THE INVENTION

1. Field of the Invention

This invention is in the field of heat-recoverable articles having an outer layer which is thermoplastically deformable, and an inner layer of a material which has elastic memory and is therefore heat recoverable.

2. Description of the Prior Art

A laminated article consisting of an outer layer which is dimensionally stable but thermoplastically deformable and an inner cross-linked, heat-recoverable layer is described in DE OS No. 23 44 086 (corresponding to U.S. Pat. No. 4,035,534). In the use of such shrinkable articles, it is common practice to indicate the existence of a specific softening temperature by means of so-called color indicators, also known as thermocolors. These color indicators produce a change in color at a specific temperature, for example, 130° C. thereby indicating to the user that the temperature required for back-shrinkage has been reached. The addition of such color indicators, however, requires an additional expense and it is likewise not always possible to find precisely matching indicators for specific temperature values in an appropriately fine graduation. Another disadvantage stems from the fact that the color indicators only indicate the surface temperature, and where the article is relatively thick or consists of multiple plies, the surface temperature can vary considerably compared from temperatures in the internal portions.

SUMMARY OF THE INVENTION

The present invention provides a means enabling the user to determine the existence of the desired softening temperature in a simple manner and without additional expenditures. With a heat-recoverable article of the type previously mentioned, this is achieved in accordance with the present invention by selecting the outer layer from a material which is opaque under ordinary temperatures but becomes transparent after the back-shrinkage temperature of the inner layer has been reached so that the condition of the inner layer can be seen from the outside of the article.

Since the outer layer is such that it becomes transparent at the restoration temperature, it is readily possible to monitor the uniformity of the heating, a characteristic which is very difficult in conventional practice since thermocolors are usually not reversible once they have changed color. It is thus possible to determine reliably the uniform attainment of the limiting temperature merely by means of selecting a suitable outer, colorless layer that becomes sufficiently transparent upon decrystallization. Additional color indicators are thus not necessary. Furthermore, in contrast to the use of color indicators which at best only determine the temperature at the surface of the article, without giving any indication of the internal temperature, the article of the present invention provides precise information as to whether and when the desired softening point has been actually and uniformly achieved.

The outer layer according to the present invention is preferably opaque at normal temperatures so that the inner layer is not visible or not clearly visible before the decrystallization point has been reached. The outer layer becomes sufficiently transparent only after appropriate heating. For example, high density polyethylene or polypropylene without significant color additives are highly opaque and are not transparent at normal temperatures since they are irregularly crystallized. The outer layer becomes transparent upon reaching the decrystallization temperature and, hence, the restoration temperature of the inner layer so that the whole assembly becomes dark, for example, when the inner layer is tinted a dark color such as black.

The outer layer preferably consists of a high density polyethylene or polypropylene. A cross-linked material suitable for the inner layer can consist of a low-density polyethylene or some other cross-linked polymer that can also be rubber-like, for example, EPR (ethylene-propylene rubber) or EPDM (ethylene propylene diene monomer) rubbers which are particularly suited for this purpose.

Under ASTM standards, low-density polyethylene has a density of about 0.910 to 0.925 while medium density means a density of about 0.926 to 0.940. High density copolymer polyethylene has a density of 0.941 to 0.959 while the high density homopolymer resin has a density of 0.960 and above.

BRIEF DESCRIPTION OF THE DRAWINGS

The invention is explained in greater detail with reference to the attached sheet of drawings wherein the structure of a heat-recoverable article is shown in cross section.

DESCRIPTION OF THE PREFERRED EMBODIMENTS

The present invention can be applied to shrink-down plastic tubing used for electrical components or as a shrink-on cable sleeve. There is provided an outer layer AS in the heat-recoverable article which is dimensionally stable in structure yet is deformable thermoplastically. The material is selected such that it is non-transparent, for example, opaque below the shrink-back temperature of an inner layer IS. The outer layer AS becomes transparent when heated, due to decrystallization. The temperature at which the outer layer AS becomes transparent, i.e., its decrystallization temperature, lies at or somewhat above (because of the potential temperature gradient) the back-shrinkage temperature of the layer IS. For most purposes, it is desirable that the decrystallization temperature is at least as high as the back-shrinkage temperature and is within 20° C. above that temperature.

The inner layer IS may be colored to improve its visibility as by adding a dark pigment, particularly a black pigment, to the inner layer IS. At the temperature of transparency, the inner layer suddenly becomes visible and the user then knows that the back-shrinking process of the inner layer IS has begun. The beginning of transparency is thus a strict indication of the condition of the inner layer IS. A slightly tinted material can be used for the outer layer AS in addition to materials which are transparent in their heated condition.

Figure 1:
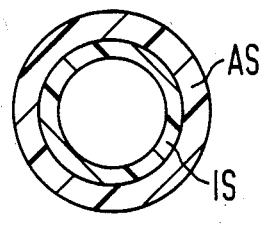
FIG. 1 illustrates the structure before the thermal back-shrinking.
Figure 2:
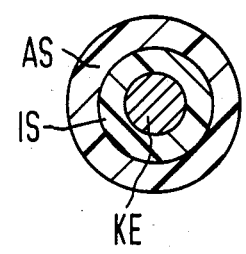
FIG. 2 illustrates the structure after the back-shrinking.

FIG. 2 shows the same arrangement in cross section wherein the heat-recoverable article has been shrunk onto a core KE. In this regard, an appropriate amount of heat is externally applied to the heat recoverable article until the outer layer AS and the inner layer IS begin to soften and thus back-shrink into their original position. Since the outer layer AS becomes transparent approximately at the time when the back-shrinking temperature has been reached, the user can perceive the uniform attainment of the softening point of the inner layer IS from the outside while supplying heat, and can correct the application of heat so that overheating does not occur at any given location. The inner layer IS is preferably tinted black or other dark color for antilight reasons but can also have any other color suitable for the task. A light screening means can also be advantageously added to the outer layer AS, provided that it does not deleteriously affect the transparency. For example, ultraviolet stabilizers can be added to the outer layer AS. In this case, the inner layer would be light-screened which would already occur in the event that the inner layer had a black coloring. The inner layer IS and the outer layer AS thus function without any color indicators being present.

Polypropylene becomes transparent at about 160° C. and high-density polyethylene becomes transparent at about 126° C. Since low-density polyethylene has a back-shrinking temperature in the range of about 130° C., the desired color indication or the induced transparency of the outer layer AS can be achieved by means of these materials, preferably in combination so that the decrystallization temperature lies just slightly above 130° C.

It should be evident that various modifications can be made to the described embodiments without departing from the scope of the present invention.

I claim as my invention:

1. A heat-recoverable article comprising:
   an outer layer of an opaque, dimensionally stable, thermoplastically deformable material and
   a colored inner layer of a cross-linked heat-recoverable material having a characteristic recovery shrinkage temperature,
   said outer layer having the property of being non-transparent below the shrinkage temperature and of becoming transparent at a decrystallization temperature at least as high as said shrinkage temperature whereby said inner layer becomes visible through said outer layer when the article is heated to said decrystallization temperature.

2. A heat-recoverable article as claimed in claim 1 wherein said outer layer consists of high density polyethylene.

3. A heat-recoverable article as claimed in claim 1 wherein said outer layer consists of polypropylene.

4. A heat-recoverable article as claimed in claim 1 wherein said outer layer consists of a mixture of polyethylene and polypropylene.

5. A heat-recoverable article as claimed in claim 1 wherein said inner layer consists of low density polyethylene.

6. A heat-recoverable article as claimed in claim 1 wherein said inner layer consists of a synthetic rubber.

7. A heat-recoverable article as claimed in claim 1 in which said outer layer contains an ultaviolet stabilizer.

8. A heat-recoverable article as claimed in claim 1 wherein said inner layer has a dark color.

9. A heat-recoverable article as claimed in claim 1 wherein said decrystallization temperature is within 20° C. of said shrinkage temperature.

* * * * *